Aug. 18, 1942.          J. F. McGINNIS          2,293,157
                        ELECTRODE HOLDER
                      Filed Sept. 29, 1941
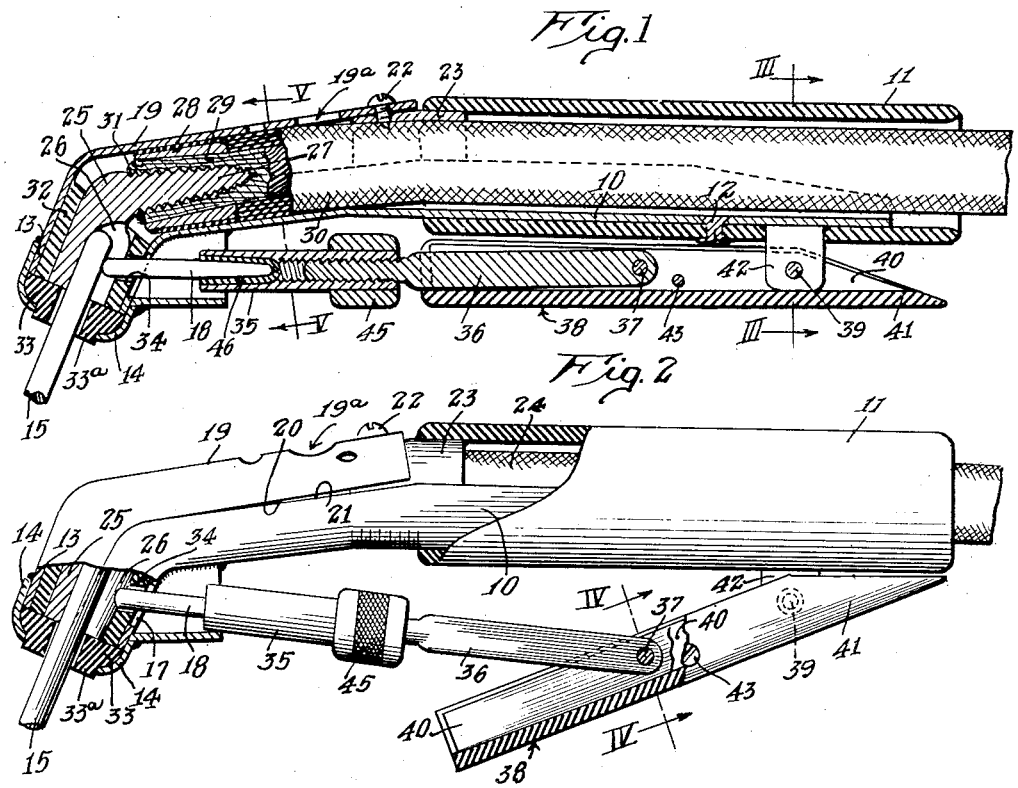
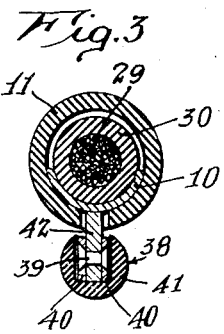
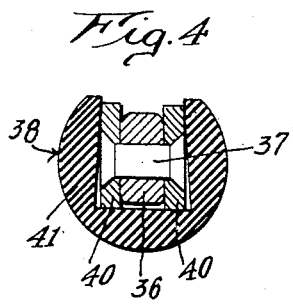
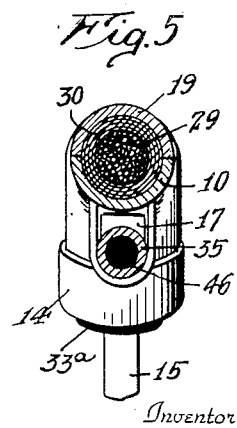
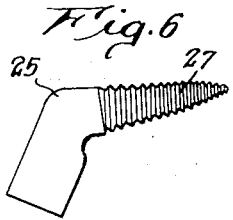
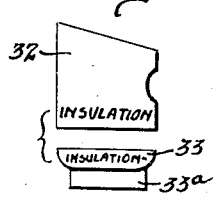
Inventor
Jesse F. McGinnis
By Lyon & Lyon
Attorneys Patented Aug. 18, 1942

2,293,157

UNITED STATES PATENT OFFICE 2,293,157

ELECTRODE HOLDER

Jesse F. McGinnis, Los Angeles, Calif., assignor to M. L. B. Manufacturing Company, Hollywood, Calif., a corporation of California Application September 29, 1941, Serial No. 412,697

4 Claims. (Cl. 219—8)

This invention relates to handles for holding electrodes for electric welding. Such devices perform the dual purpose of mechanically supporting the electrode, and also completing electrical connection thereto.

An object of the invention is to provide a particularly convenient and safe electrode holder.

Another object is to provide an electrode holder providing positive electrical connection to the electrode.

Another object is to provide a holder that is easily, and quickly, assembled and disassembled.

Another object is to provide an electrode holder in which the current-carrying parts are thoroughly electrically insulated, and also enclosed with metal to prevent injury to the operator resulting from arcs and flashes.

Other more specific objects and features of the invention will become apparent from the detailed description to follow, with reference to the drawing, of a particular embodiment of the invention.

In the drawing:

Fig. 1 is a longitudinal section through an electrode holder in accordance with the invention, shown in closed, or clamping, position;

Fig. 2 is a side elevation, with certain parts broken away and showing the holder in open, or electrode-releasing position;

Fig. 3 is a cross section in the plane III—III of Fig. 1;

Fig. 4 is a cross section in the plane IV—IV of Fig. 2;

Fig. 5 is a section taken along the line V—V of Fig. 1;

Fig. 6 is a detail, side elevation of the electrode socket; and

Fig. 7 is a side elevation showing two moulded insulation members employed in the holder.

As shown in the drawing, the electrode holder comprises a main frame member 10 formed of sheet metal, and trough shaped, as clearly indicated in Figs. 2 and 3. The rear portion of the member 2 is enclosed by and riveted to a hollow, cylindrical fiber handle 11. Attachment is made by a single rivet 12.

The member 10 projects from the forward end of the handle 11, and, slightly beyond the point of projection, it is bent downward at a slight angle. The handle 11 may be approximately 5 or 6 inches in length, and the frame member 10 may extend forwardly and slightly downwardly from the end of the handle 11 for a distance of approximately 3 inches, at which point it is bent downward quite sharply, and its extreme end welded, as indicated at 13, to an annular nosepiece 14 through which an electrode 15 is intended to project. The nosepiece 14 is preferably made of copper, or a copper base alloy, since splatterings from the weld do not adhere to such materials as well as to many others.

Immediately back of the nose 14, the body member 10 has an opening 17 formed therein for the projection of a locking pin 18, to be described later.

A detachable cover plate 19 cooperates with the exposed part of the frame member 10, to form therewith an enclosure for a current-supply cable 24, and for a socket 25 that supports and supplies current to the electrode 15. The lateral edges 20 of the cover plate 19 abut against the lateral edges 21 of the frame member 10, and these edges are held in abutting relation by the support provided for the cover plate 19 at its front and rear ends. The support for the front end of the cover plate is provided by the nose 14, into which the extreme end of the cover plate projects. Support for the rear end is provided by a screw 22, which passes through a hole provided therefor in the cover plate, and is threaded into a curved bridge member 23, which is welded at its ends to the frame member 10. To place the cover plate 19 in position, the forward end is first inserted into the socket 14, and then the rear end is secured in position with the screw 22. To remove the cover plate, the procedure is reversed. The bridge member 23 also functions to support the forward end of the fiber handle 11.

The welding current is supplied to the electrode 15 through the insulated cable 24, which extends through the handle 11 and is electrically connected to the electrode 15 by means of the socket 25. Thus the socket 25 has a channel 26 in its forward end for receiving the electrode 15, and has a tapered, threaded tail 27 on its rear end, which tail cooperates with a tapered sleeve 28, to make electrical connection with the conducting core 29 of the cable 24. The core 29 is made of stranded copper wire, and the socket is connected thereto by first stripping the insulation 30 away from the end portion of the core, and then inserting the core in the sleeve 28, after which the strands of the core are separated at the center, and the tapered, threaded tail 27 of the socket is screwed in until it wedges the strands of the core tightly against the sleeve 28. The resistance of the electrical connection may thereafter be further reduced by soldering the strands to the socket, as indicated at 31.

The foregoing operations for securing the socket 25 to the cable are performed with the cover plate 19 removed, and with the cable projecting through the handle 11 a sufficient distance to provide freedom of action for the operations described. While the cable and socket are in this position, all exposed parts of the sleeve 28 are wrapped with an insulating tape of heat-resisting material, such as glass tape, to prevent any possible electrical contact between the current-carrying elements and the housing members. Thereafter, the socket 25 is inserted into an insulating bushing 32 and against an insulating washer 33 in the nose of the tool. The insulating bushing 32 and washer 33 may be of an asbestos-base, moulded insulation. They maintain the socket 25 in concentric relation with the nose 14, so that when the electrode 15 is locked in the socket the electrode is held clear of the metal nose. Furthermore, the washer 33 has an annular flange 33a projecting through the nose 14, to prevent the welding rod being bent into contact with the metal nose.

After the socket 25 has been positioned within the insulating bushing 32, the cover plate 19 is secured in position, as previously described.

It has been stated that the electrode 15 is locked in the socket 25 by a lock pin 18. As shown in Fig. 1, the lock pin extends through the opening 17 in the housing and a registering opening 34 in the insulating bushing 32, and bears against the side of the electrode 15, to hold the latter firmly against the opposite side of the socket. The lock pin 18 has secured to its rear end, a sleeve 35, the rear end of which is internally threaded and screwed onto the forward, threaded end of a toggle link 36, the latter being pivotally secured at its rear end, as by a rivet 37, to a locking handle 38, positioned immediately below the handle 11, and pivotally supported thereon adjacent its rear end by a pivot pin 39.

The locking handle 38 is formed of a pair of metal plates 40 enclosed in a channel shaped piece of fiber 41. The pin 39 extends through a metal tongue 42 which is welded to the main frame 10 and extends through a slot provided therefor in the fiber handle 11. This tongue 42 is positioned between the two metal plates 40 of the locking handle 38. The fiber handle 41 is secured to one of the plates 40 by a screw 43. The rear end portion of the link 36 is flat and fits between the two metal plates 40 of the locking handle.

When it is desired to change the electrode, the locking handle 38 is rocked away from the handle 11, as shown in Fig. 2. This movement can be very quickly effected by simply squeezing the rear end of the locking handle 38 toward the main handle 11, at a point rearwardly of the pin 39, so that the toggle-locking mechanism can be rocked into the position shown in Fig. 2 instantly. Such rocking movement is permitted by virtue of the fact that the rear end 42 of the locking handle is beveled, as shown, so as not to interfere with the main handle 11. In the unlocked position, as shown in Fig. 2, the locking pin 18 is retracted to free the electrode 15, which can thereupon drop out of the socket 25. A new electrode is then inserted into the socket, and locked in place by restoring the locking handle 38 to its normal position. This restoring operation can be readily performed with the fingers of the hand holding the handle 11, while the other hand is employed to support the electrode 15.

When the locking handle 38 is in locking position, as shown in Fig. 1, the axis of the rivet 37 is slightly above a line connecting the axis of the pivot 39 with the tip of the locking pin 18, so that the force of the pin against the electrode yieldably maintains the locking handle in locking position. Accidental disengagement is further prevented by the fact that the welder's hand extends around the handle 11 and the locking handle 38, in normal use.

Any desired pressure of the pin 18 against the welding electrode 15 can be obtained by rotating the sleeve 35 on the threaded, forward end of the link 36. To facilitate this adjustment, a fiber-insulating bushing 45 is provided on the rear end of the sleeve 35.

The hole 34 in the insulating bushing 32 is dimensioned to fit the pin 18 fairly snugly, so that it acts as a lateral support for the forward end of the locking pin 18 at all times.

The locking pin 18 is, of course, electrically connected to the electrode 15, and this pin is therefore preferably secured in the sleeve 35 by embedding it in insulating material 46, so that there can be no electrical path to the sleeve 35, and thence through it and the link 36 and the plates 40, to the main frame 10.

Another important advantage of the construction described is that current is conducted directly from the cable to the electrode socket, thereby reducing resistance losses and objectionable heating.

Still another advantage of the construction is that all electrical insulation is completely enclosed by metal parts, thereby preventing damage to the insulation, and reducing danger to the operator as a result of any possible arcs or flashes within the tool.

The use of the metal frame insulated from the welding circuit has the additional advantage of preventing arcs between the frame and the work as the result of accidental contact therebetween. This enables the operator to work with short electrodes without danger, and makes it possible to use the welding rod or electrode practically up to the insulating bushing 33.

Another important feature of the invention is the use of ventilating apertures 19a in the cover plate 19 to facilitate the dissipation of heat transmitted from the welding rod to the welding socket 25, and the core of the electrical conductor 24. The construction whereby the socket 25 is connected directly to the cable core also facilitates dissipation of heat from the electrode 15, especially when the latter becomes very short. In some holders, in which no provision is made for rapid conduction of heat away from the electrode, the latter soon becomes too hot to function properly.

Although for the purpose of explaining the invention a particular embodiment thereof has been described in detail, it is to be understood that various departures from the exact construction shown will occur to those skilled in the art, and the invention is therefore to be limited only to the extent set forth in the appended claims.

I claim:

1. An electrode holder comprising handle means, an electrode socket, means for locking an electrode to said socket, means for supporting said socket from said handle, and means for effecting direct electrical connection between said socket and a current-supply cable, including a pin member integral with said socket and adapted to extend into the end of a stranded cable conductor, and a sleeve adapted to surround the pin and the separated strands of the cable and compress the strands against said pin.

2. A device of the type described, comprising handle means, an electrode socket, means for locking an electrode to said socket, frame means for supporting said socket from said handle means, and means for effecting electrical connection between said socket and a current-supply cable; in which said socket is of channel shape and the bottom of the channel constitutes an electrode seat, a backing element in said frame means for supporting the side of said socket opposite the channel therein, and means movable laterally into the open side of said channel-shaped socket for engaging an electrode therewithin and clamping it against said seat.

3. An electrode holder comprising a channel shaped, elongated metal frame, open on the top, handle means secured to the rear portion of said frame and enclosing said rear portion, a nose member secured to the forward end of said frame and defining a rearwardly extending flange, means within said nose for supporting an electrode and completing electrical connection between said electrode and a conducting cable extending through the channel of said frame member, and detachable cover means for forming with the forward portion of said frame member a substantially complete enclosure for the cable conductor and electrode supporting means therewithin, said cover means having a forward end adapted to fit within said flange on said nose for retaining said forward end of the cover means against lateral movement, and detachable connecting means for securing the rear end of said cover means to said frame member.

4. An electrode holder as described, comprising a metallic frame defining a tubular passage, an electrode socket mounted in said passage for supporting an electrode projecting out of the front end thereof, the front end of said frame having an orifice for the passage of the electrode which is of substantially larger diameter than the electrode, insulating means for insulatingly supporting the electrode holder within said frame, including an insulating washer within said front end of said frame, said washer having a flange extending through said opening in the end of the frame in concentric relation between the end of said frame and the electrode, said insulating means preventing electrical contact between the electrode and said frame.

JESSE F. McGINNIS.